Aug. 17, 1943.　　L. R. BUCKENDALE　　2,326,753
MULTISPEED DRIVE AXLE
Filed Oct. 3, 1941
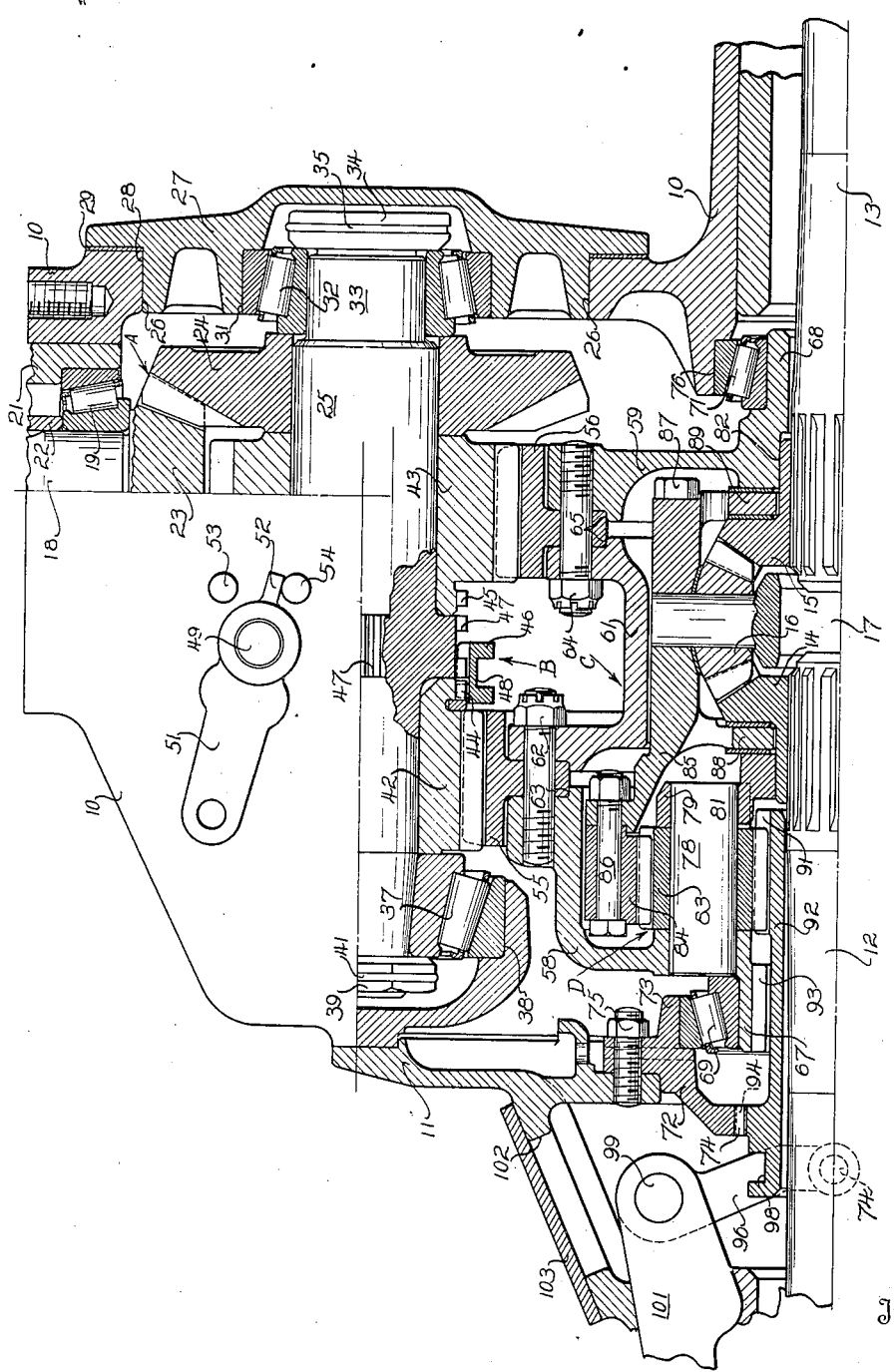
Inventor
Lawrence R. Buckendale
By Strauch & Hoffman
Attorneys Patented Aug. 17, 1943

2,326,753

UNITED STATES PATENT OFFICE 2,326,753

MULTISPEED DRIVE AXLE

Lawrence R. Buckendale, Detroit, Mich., assignor to The Timken-Detroit Axle Company, Detroit, Mich., a corporation of Ohio Application October 3, 1941, Serial No. 413,539

3 Claims. (Cl. 74—314)

The present invention relates to multi-speed power transmitting mechanisms and more particularly to planetary drive axles, although it is not limited to such use.

Although planetary drive axles have been in use for a number of years in the truck and bus field, and recently have gone into limited use in pleasure cars to provide an overdrive at the higher or cruising speeds, they do not fully satisfy the requirements of modern transportation, primarily because they lack a sufficient degree of speed reduction, nor do they provide a sufficient number of speeds to afford the proper degree of flexibility to meet all operating conditions encountered in normal service.

In my co-pending application Serial No. 413,538, filed on even date herewith, for Multispeed drive axle, there is disclosed a drive axle embodying a combination of planetary and non-planetary units, which provides a greater degree of speed reduction than the axles now in use, and the present invention deals with a drive axle having all of the advantages of that construction and in addition provides additional selectively available speed ratio and further novel improvements and refinements.

The major object of this invention is to provide a novel drive axle having planetary and non-planetary two-speed gear mechanisms arranged in series and operable to transmit power from the drive shaft to the axle shafts, which is low in cost, simple in design, and yet efficient and durable in service.

Another important object is to provide a drive axle having parallel counter and axle shafts, with two-speed spur and planetary mechanisms associated respectively with the counter and axle shafts and operable to transmit power therebetween at a plurality of different speed ratios.

A further object is to provide a drive axle with a novel planetary mechanism having a rotor made up of a plurality of detachable sections and rigidly clamping gears between them, providing maximum strength and compactness.

The invention further aims to provide novel countershaft and housing assemblies, and to also design the parts so that the axle may, if desired, be converted into a different form of unit having an additional planetary speed reduction on the countershaft, with a minimum of change of parts.

Further objects of the invention will become apparent as the specification proceeds in conjunction with the annexed drawing, and from the appended claims.

In the drawing, the single figure is a horizontal longitudinal section through a drive axle embodying the invention, part of the housing being shown in top plan view to simplify the disclosure.

Very briefly the mechanism comprises a pinion shaft transmitting power through a bevel gear set A to a countershaft from which power is transmitted through a spur gear set B to a planetary rotor C. Power is selectively transmitted from the latter to the axle shafts at two different gear ratios by means of a planetary mechanism designated as D.

The mechanism is contained in a transversely divided housing made up of a main section 10 and an auxliary housing section 11. The two sections are clamped together along a plane transverse to the axle shafts in well known manner (not shown). A pair of axle shafts 12 and 13 are journalled in axle arms carried by the housing sections in well known manner, and are splined to differential side gears 14 and 15, respectively. Miter gears 16, carried by a differential spider 17, mesh with the differential side gears and divide the power between the two axle shafts in well known manner.

PRIMARY DRIVE

Power is transmitted to the axle by means of a pinion shaft 18 journalled in a front bearing (not shown) and a rear bearing 19 located in a bearing sleeve 21 secured to housing section 10 in well known manner. A sleeve 22 cooperates with the inner bearing races to provide the proper working clearances in well known manner.

Pinion shaft 18 is accordingly mounted for rotation in the housing and may be removed as a unit, along with its bearings, by removing sleeve 21. Shaft 18 carries a bevel pinion 23 which meshes with a bevel gear 24 rigidly secured to a countershaft 25. If desired, the gears may be of either the spiral bevel or the "hypoid" type. Also, if desired, worm or other well known types of gearing may be used in place of the bevel gears shown.

By providing an opening 26 in housing section 10 of sufficiently large diameter to receive gear 24, and supporting the shaft in a closure assembly detachably secured over the opening, the entire countershaft assembly may be readily removed by removing the closure assembly, and sliding the assembly as a unit to the right and out of the housing.

In the present instance the closure assembly has been shown as comprising an internally ribbed member 27, having a piloting surface 28 snugly engaging opening 26. The closure assembly is detachably held in place by means of cap screws (not shown), and preferably a plurality of shims 29 are interposed between it and the face of the housing to provide the proper bearing adjustment. Mounted in an annular seat 31 in closure 27 is the outer race of an antifriction bearing 32. The inner bearing race is secured to a reduced portion 33 of a countershaft by means of a nut 34 and a lock ring 35.

The other end of the countershaft is journalled in a bearing 37, whose outer race is carried in a seat 38 provided in housing section 10. The inner bearing race is held on a shaft by a nut 39 and lock ring 41.

From the foregoing it is apparent that power is transmitted from shaft 18 to countershaft 25 through the bevel pinion and bevel gear, the countershaft is journalled for free rotation in the housing, and that by removing closure 27 the entire countershaft assembly may be moved to the right and out of the housing. This makes it possible to avoid splitting the housing adjacent the plane of the propeller shaft, and to provide both of the countershaft supports in a single housing.

Spur Gear Reduction

Power is selectively transmitted from the countershaft to the planetary rotor at two different speed ratios by means of a spur gear mechanism that will now be described, and which doubles the number of speed ratios available in the planetary unit.

Mounted for free rotation on the countershaft are low and high speed pinions 42 and 43 provided with clutch teeth 44 and 45, respectively, which cooperate with a toothed clutch member 46 coacting with teeth 47 provided on the countershaft. The clutch member is provided with a yoke groove 48 in which the arms of a shifter yoke (not shown) ride in well known manner. The shifter yoke is mounted upon a shaft 49, and secured to the shaft, externally of the housing, is an actuating lever 51 having a finger portion 52 cooperating with stop pins 53 and 54 on the housing. The high and low speed pinions mesh with spur gears 55 and 56, respectively, carried by planetary housing structure C.

Operation

With clutch 46 in the position shown in the drawing, and with the countershaft being driven by the bevel gears, countershaft teeth 47 drive clutch member 46, which in turn through teeth 44 drive low speed pinion 42. The low speed pinion is accordingly synchronously driven with the countershaft, and drives gear 55 and the planetary rotor in the low speed ratio.

When clutch member 46 is shifted into its right hand position, it meshes with teeth 45 and causes high speed pinion 43 to rotate synchronously with the countershaft and drive gear 56 and the rotor in the high speed ratio. When the clutch member is disposed in its mid position, no power is transmitted and the unit is in "neutral."

The spur gear assembly just described is more fully disclosed in the co-pending application of Nelson R. Brownyer for "Power transmission mechanism" filed April 10, 1941, Serial No. 387,977, which may be referred to for a more complete disclosure thereof.

From the foregoing disclosure it is apparent that power is transmitted through the constantly meshed bevel gear set to the countershaft at a speed reduction, and that a further speed reduction is effected through the low and high speed spur gear mechanism. The particular speed ratios obtained in the spur assembly will depend upon the relative diameters of the gears, it being understood that the gear sizes will be so chosen as to afford the proper gear reduction necessary to suit the requirements of the particular installation involved. It is also to be understood that if a further gear reduction between the propeller shaft 18 and countershaft 25 is desired, the entire countershaft assembly, including cover 27, may be removed from the mechanism and be replaced by a combined planetary gear mechanism and countershaft assembly of the character shown in my co-pending application filed Oct. 3, 1941, for "Multispeed drive axle," Serial No. 413,540.

Planetary Mechanism

Power is transmitted from rotor C to the axle shafts at two different speed ratios by means of a planetary gear mechanism which is compactly associated with the axle shaft and spur gear assemblies in novel manner.

Rotor C is made up of a large diameter end section 58, a smaller diameter end section 59, and a central section 61. Gear 55 is rigidly clamped between mating faces provided on sections 58 and 61 by means of stud and nut assemblies 62. Pilot faces 63 are provided on the rotor sections and cooperate with the web of the gear to insure accurate alignment of the sections and to also afford additional support for the gear.

Gear 56 is clamped between rotor sections 59 and 61 by means of stud and nut assemblies 64, and similar piloting faces 65 on the rotor sections cooperate with the internal surface of the gear. The resulting construction is extremely rigid and yet is of light weight and may be readily disassembled for service and replacement of parts.

The end sections of the rotor are provided with hub portions 67 and 68, which are journalled in bearings 69 and 71, respectively. Bearing 69 is carried in a ring-like support 72 having a bearing supporting flange 73 and a set of internal teeth 74. The support is secured to an inwardly directed flange in the housing by means of stud and nut assemblies 75. Bearing 71 is carried in a seat 76 formed directly in housing section 10.

The rotor structure is accordingly mounted for accurate rotation in the housing sections about the axis of the axle shafts, and by clamping the spur gears between the rotor sections, they mutually reinforce each other and also simplify assembly and disassembly of the structure. Also, by removing housing section 11, and shifting the rotor bodily to the left, sufficiently to remove bearing 71 from its outer race, the rotor may be completely removed from the mechanism. After removal of the rotor, closure assembly 27 may be removed and the countershaft assembly slid to the right and removed from the casing. If desired, sleeve 21 may be unbolted and slid forwardly out of the housing to complete the disassembly operation.

Power is transmitted directly from rotor section 58 to a plurality of shafts 78, which are rigidly secured in aligned openings in section 58 and in a ring member 79. The ring and rotor section 58 are each provided, intermediate shafts 78, with matching bosses and are rigidly bolted together (not shown) in well known manner.

Ring 79 is provided with a hub portion 81 in which side gear 14 is journalled, side gear 15 being journalled in a bore 82 provided in rotor section 59.

A planet gear 83 is journalled on each shaft 78 and constantly meshes with an orbit or ring gear 84 secured to a differential casing 85 by means of bolt and nut assemblies 86. Casing 85 is transversely split along the plane of the differential spider, and secured together by cap screws 87, the ends of the spider being clamped in place between the halves in well known manner. Casing 85 is provided with spaced web portions 88 and 89 having thrust washers on their opposite faces, which limit axial movement of the casing by engaging ring 79 at one end and the hub of rotor section 59 at the other. Webs 88 and 89 are spaced from the hubs of gears 14 and 15, with the result that casing 85, through internal gear 84 and miter gears 16 floats respectively on the pitch lines of planet gears 83 and side gears 16 and 17.

Planet gears 83 also constantly mesh with sun gear teeth 91 provided on a sleeve or a quill member 92, which is mounted for both rotational and axial movement in the housing. Sun gear teeth 91 are also adapted to mesh with internal teeth 93 provided inside rotor section 58. The quill is also provided with external teeth 94 adapted to be selectively meshed with stationary teeth 74.

The quill is adapted to be shifted into its various operative positions by means of a yoke member 96, having pins 97 riding in a groove 98 in the quill. The yoke is rigidly secured to a shaft 99, and secured to the shaft externally of the housing is an actuating lever 101.

Access to the yoke mechanism is obtained through an opening 102 in housing section 11, and adapted to be closed by a plate 103 detachably secured in place.

*Operation*

Assuming that rotor C is undergoing rotation either through the low speed spur gears 42 and 55 or high speed spur gears 43 and 56, and that the quill is disposed in the position shown, quill teeth 94 are engaged with stationary teeth 74 and the quill is accordingly locked against rotation. Under these conditions planet shafts 78 effect planetation of gears 83, and the latter, rolling about stationary sun gear 94, cause internal gear 84 to be revolved in the same direction, but at a higher speed than shaft 78. Casing 85 is therefore driven at an increased speed or at an overdrive ratio.

When lever 101 is operated to shift the quill to the left, sufficiently to disengage teeth 94 from teeth 74, but insufficiently to bring the sun gear into mesh with teeth 93, no power will be transmitted through the mechanism because rotation of planet shafts 78 merely causes the planets and quill to idle without transmitting power to casing 85.

Assuming now that the quill is shifted into its extreme left-hand position, with sun gear teeth 91 in mesh with teeth 93 of rotor section 58, and also in partial mesh with the planets, the latter are locked against rotation about their axes, with the result that rotation of the planet shafts about the rotor axis causes the locked planets 83 to drive ring gear 84 and casing 85 synchronously with rotor C, or at a one-to-one ratio, power being transmitted through casing 85 and divided between the axle shafts 12 and 13 by the differential in well known manner. It is to be understood that the foregoing shifting operations are carried out by momentarily releasing the vehicle clutch, but if desired, the "easy shift" feature of the aforementioned Brownyer application may be incorporated in the planetary mechanism to enable the shift to be made without declutching.

From the foregoing disclosure it is apparent that there is provided a drive axle embodying three speed reductions, one of which is constant, namely, the bevel gear reduction, and two of which are variable, namely, the spur gear assembly and planetary gear mechanism, and that by operating levers 51 and 101 four different speed ratios are available, by shifting them in various combinations. For instance, the spur gear reduction may be operated in high or low gear, and the planetary mechanism may be operated in direct or overdrive ratio for each ratio of the spur gear assembly. The planetary rotor and the countershaft assembly are related in novel manner and are also designed to afford maximum simplicity, rigidity, strength and accessibility with minimum weight. Also, the housing assembly is of novel form, permitting ready substitution, if desired, of a modified countershaft and closure assembly to afford an additional planetary speed reduction between the bevel gear and countershaft.

Although I have shown the invention as embodied in a drive axle having a transversely split axle housing, it is to be understood that if desired the housing may be of one-piece form, and the counter and pinion shafts, together with the gear mechanisms, supported in a bolted on auxiliary housing or carrier, without departing from the spirit of the invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a housing having a pair of axle shafts and a countershaft mounted for rotation therein about parallel axes; a hollow rotor mounted for rotation about the axis of said axle shafts; a two-speed spur gear assembly for transmitting power from said countershaft to said rotor; a two-speed planetary mechanism in said rotor for transmitting power from the latter to said axle shafts, said spur gear assembly being substantially wholly disposed between a pair of parallel planes passing through the ends of said rotor and disposed normal to said counter and axle shafts, said countershaft being mounted in spaced anti-friction bearings in said housing, at least one of said bearings being wholly contained between said pair of spaced parallel planes passing through the ends of said rotor.

2. In a drive axle, a housing having a pair of axle shafts and a countershaft mounted for rotation therein about substantially parallel axes; gear means in said housing for transmitting power to said countershaft; a hollow rotor mounted for rotation about the axis of said axle shafts; a two-speed spur gear assembly for transmitting power from said countershaft to said rotor; a two-speed planetary gear mechanism in said rotor for transmitting power from the latter to said axle shafts, comprising a casing rotatable in said housing about the axis of said axle shafts and embodying differential means for transmitting power from the casing to said axle shafts; an orbit gear carried by said casing; a plurality of planet gears carried by said rotor and constantly meshing with said orbit gear; an axially shiftable sun gear meshing with said planet gears and embodying means for selectively coupling it to either said rotor or said housing, to provide a direct drive or an overdrive respectively between said rotor and said casing; said spur gear assembly being substantially wholly disposed between a pair of parallel planes passing through the ends of said rotor and disposed normal to said counter and axle shafts.

3. The drive axle defined in claim 2, wherein said means for transmitting power to said countershaft comprises a drive shaft rotatably mounted in said housing to one side of said countershaft and disposed at right angles thereto, and a bevel pinion on said drive shaft meshing with a bevel gear on said countershaft, and said bevel gear and said planetary gear mechanism are located on opposite sides of a vertical plane containing the axis of said drive shaft, with the bevel gear to one side of, but disposed in close proximity to one end of, said rotor.

LAWRENCE R. BUCKENDALE.